J. E. ANGER.
SUSPENSION DEVICE FOR BRAKE BLOCKS.
APPLICATION FILED JAN. 16, 1914.

1,164,447.

Patented Dec. 14, 1915.
3 SHEETS—SHEET 1.

J. E. ANGER.
SUSPENSION DEVICE FOR BRAKE BLOCKS.
APPLICATION FILED JAN. 16, 1914.

1,164,447.

Patented Dec. 14, 1915.
3 SHEETS—SHEET 3.

Witnesses
Grace P. Brereton
G. B. Wright

Inventor
John Edward Anger
By Sturtevant & Mason
Attorneys

UNITED STATES PATENT OFFICE.

JOHN EDWARD ANGER, OF PRESTON, ENGLAND.

SUSPENSION DEVICE FOR BRAKE-BLOCKS.

1,164,447. Specification of Letters Patent. Patented Dec. 14, 1915.

Application filed January 16, 1914. Serial No. 812,462.

*To all whom it may concern:*

Be it known that I, JOHN EDWARD ANGER, a citizen of the United States of America, residing at Preston, in the county of Lancaster, in the Kingdom of England, have invented certain new and useful Improvements in Suspension Devices for Brake-Blocks, of which the following is a specification.

This invention has reference to hangers or suspension devices for brake blocks or wearing shoes used upon railway and tramway vehicles, and the object of the invention is to provide certain improved means for taking up the wear of the bearings or pivoted connections of the hanger.

To this end my invention consists in the novel construction, arrangement and combination of parts herein shown and described and more particularly pointed out in the claims.

Figure 1:
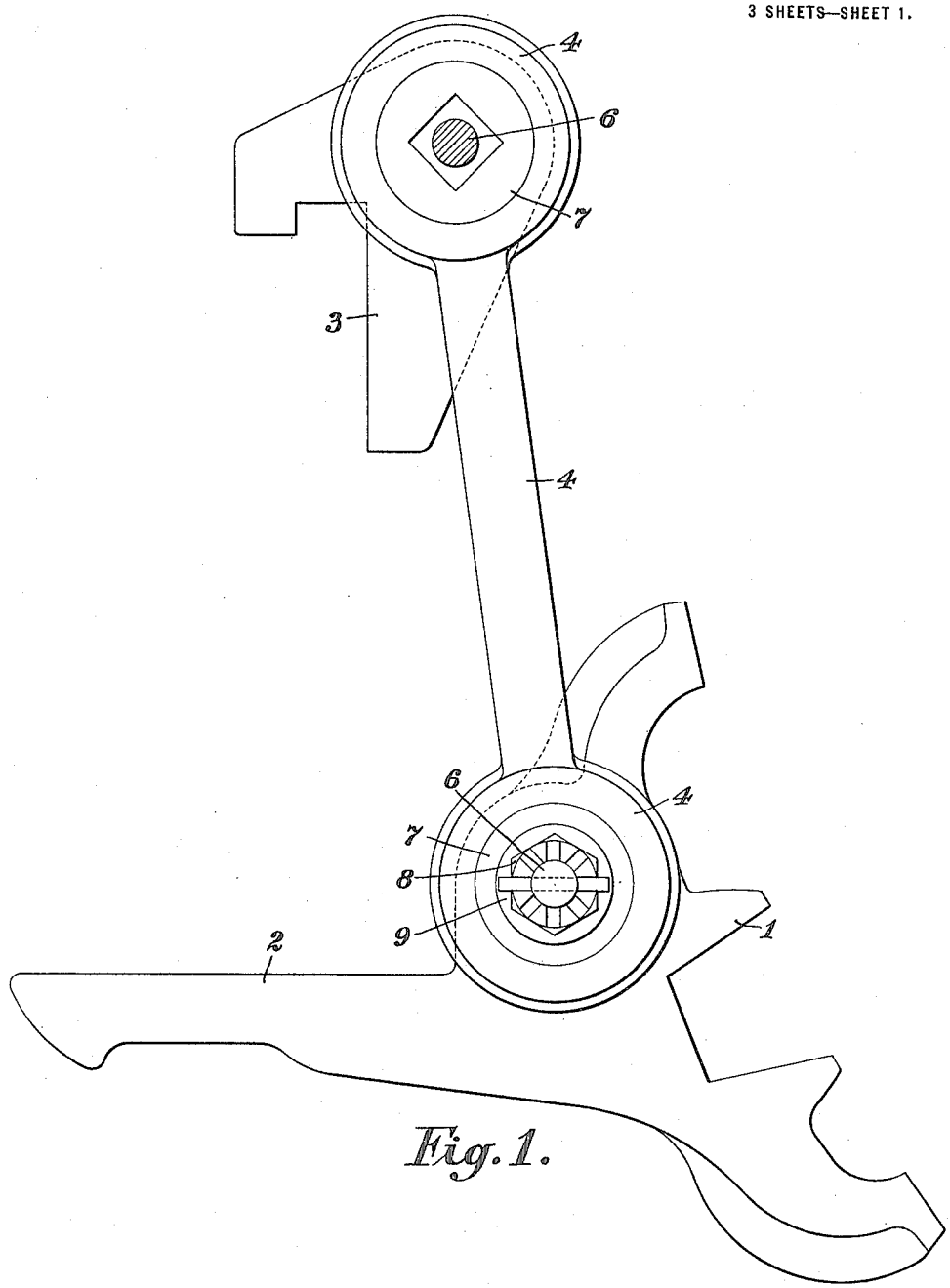
Figure 2:
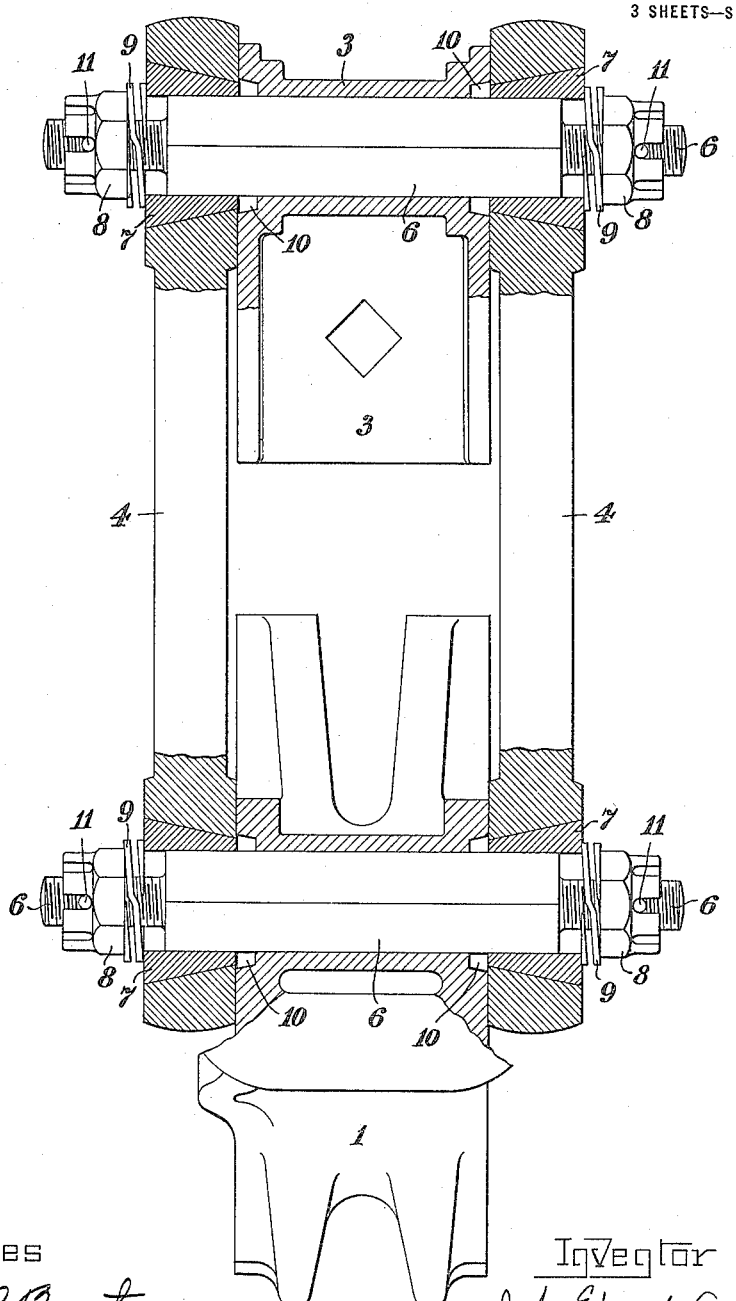
Figure 3:
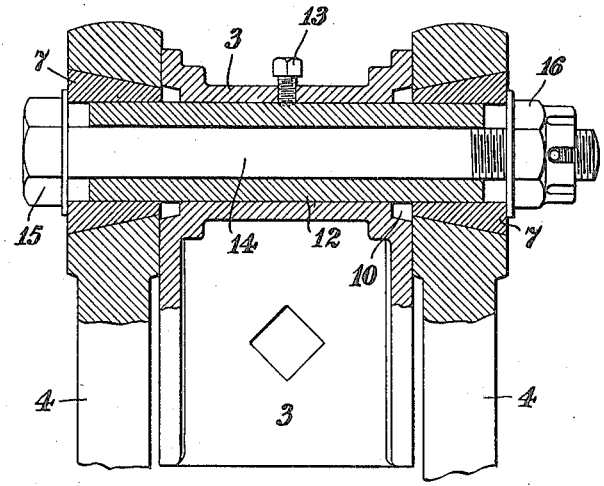
Figure 4:
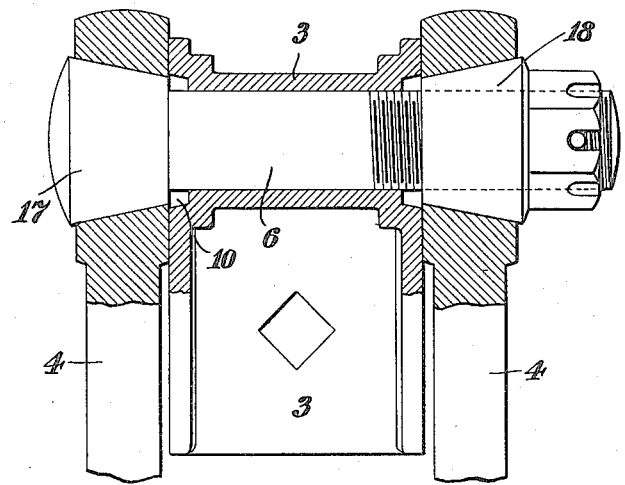

In the accompanying drawings:—Figure 1 is a side view of my device for hanging or suspending brake blocks; and Fig. 2, an end view thereof partly in section. Figs. 3 and 4 are end views, partly in section, showing slightly modified forms of the invention.

In the drawings, 1 is one of the brake shoe carriers attached at 2 to the end of the usual brake beam, 3 the brake supporting bracket, and 4 the suspension links for suspending the carrier 1 from the bracket 3. The suspension links 4 of each brake block are hung from conical bushes 7 on a steel pin 6, which latter is passed through a hole in the brake supporting bracket 3. The pin 6 is preferably made square except at the two ends, and the holes through which this squared part passes, are made of corresponding shape, so that the pin cannot revolve or become displaced. The two ends of the squared part project at each side of the bracket 3, and mounted on each of these two projecting ends, is the conical wearing bush or follower 7. The suspension links 4 which are bored at their upper ends with corresponding conical holes, are journaled or hung on these bushes 7 with the bracket 3 intervening between, and any pressure or pull on the links 4, forces such links against the bracket 3. These cones 7 are so mounted on the square part of the pin 6, as to be free to move longitudinally, while being prevented from rotary motion around the axis of the pin, due to the square shape of the pin, the hole in each cone being of corresponding shape.

The two ends of the pin 6 are turned down to suitable size and threaded to receive the nuts 8, one of which (or a head) abuts by means of a washer against one of the conical bushes, while the nut at the other end abuts by means of a washer against the other conical bush, or spring washers 9 can be introduced under the nuts. Consequently the conical bushes 7 are held in contact with the conical holes in the suspension links 4 so there is no looseness or play and yet the suspension links can swing freely. When the conical holes in the links, or the conical bushes themselves become worn, the nuts at the end of the bolt 6 are screwed up, thus sliding the bushes 7 longitudinally so as to compensate for wear and prevent rattling. The bracket 3 is recessed at each side around the hole so as to provide clearance for the longitudinal movement of the conical bushes, these recesses being shown at 10, and the nuts at the end of the bolt are preferably provided with a nut locking means 11 of any suitable kind.

The invention also applies at the place where the eyes at the lower ends of the suspension links, are journaled or coupled on to the brake shoe carrier 1, the pin 6 in that case being passed through a square hole in the carrier as shown. The arrangement is the same as that hereinbefore described, similar reference numerals indicating like or corresponding parts.

Instead of the conical bushes 5 being mounted on a solid steel pin 6, they can be mounted in a hollow steel pin 12 which is fixed, if desired, in position in the bracket 3 by means of a set screw 13 or otherwise, so that it cannot revolve or become displaced as shown in Fig. 3. Through the hollow steel pin 12 is passed a pivot bolt 14, the head 15 of which at one end abuts against one of the conical bushes 7, while a nut 16 at the other end abuts by means of a washer against the other conical bush 7. Another plan would be to make the solid pin 6 with a conical head 17 at one end, and a conical nut 18 at the other end on which the hangers 4 are journaled as shown in Fig. 4.

I declare that what I claim is:—

1. In a suspension device for brake blocks, the combination with the brake supporting bracket and brake shoe carrier and the suspension links, of pins passing through the said brackets and carriers and conical wearing bushes carried by the said pins and recessed into the suspension links from the outside to suspend the carrier from the bracket, the smaller ends of the conical bushes pointing toward but not touching the bracket and carrier.

2. In a suspension device for brake blocks, the combination with the brake supporting bracket or brake shoe carrier, of a non-rotary pin or bolt passed through the holes therein, conical replaceable bushes recessed into the suspension links from the outside, and so mounted on the projecting ends of such pin or bolt as to be free to be adjusted axially, while being prevented from rotary motion around the axis of the pin, the head of the nut at one end of the pin abutting against one conical bush, and a nut at the other end of the pin bearing by means of a washer against the other conical bush.

3. In a suspension device for brake blocks, a brake supporting bracket and brake shoe carrier, a non-rotating pin or bolt passed through a hole in the bracket or carrier, a pair of suspension links, one on each side of the bracket and carrier, conical replaceable bushes or followers mounted on the projecting ends of such bolts, so as to be free to be adjusted axially and recessed into the conical holes in the links from the outside, said bushes having an axial movement only and being prevented from rotating so that the links swing on the bushes.

4. In a suspension device for brake blocks, a brake supporting bracket and brake shoe carrier, a non-rotating pin passing through a hole in the bracket, a pair of suspension links, one on each side of the bracket and carrier, conical bushings mounted on the projecting ends of said pins, so as to be free to be adjusted axially and recessed into the conical holes from the outside, said bushing having an axial movement and being prevented from rotating on the pins so that the links swing on the bushings.

5. In a suspension device for brake blocks, a brake supporting bracket and brake shoe carrier, a pin passing through the said bracket and carrier, so that it cannot rotate, a pair of suspension links, one on each side of the bracket and carrier, conical wearing bushings mounted on the pins against rotation and recessed from the outside into the conical holes in the links, and means for locking the bushings on the pins within the suspension links.

6. In a suspension device for brake shoes, a brake supporting bracket and brake shoe carrier, bolts passing through the said bracket and carrier, conical wearing bushings carried by the bolts and held against rotation thereon, a pair of suspension links, one on each side of the bracket and carrier and having tapered sockets or holes receiving the conical bushings the smaller ends of which point toward the bracket and carrier, and means for forcing the conical bushings into the tapered sockets in the links from the outside, whereby the links swing on the bushings and by the arrangement of the bushings the normal tendency of the links is to move inwardly to prevent spreading of the links.

In witness whereof, I have hereunto signed my name this 7th day of January 1914, in the presence of two subscribing witnesses.

JOHN EDWARD ANGER.

Witnesses:
 WM. PIERCE,
 W. WATSON.

Copies of this patent may be obtained for five cents each, by addressing the "Commissioner of Patents, Washington, D. C."